(12) United States Patent
Spohn et al.

(10) Patent No.: US 9,587,761 B2
(45) Date of Patent: Mar. 7, 2017

(54) MULTI-POSITION ACTUATOR

(71) Applicant: GM GLOBAL TECHNOLOGY OPERATIONS LLC, Detroit, MI (US)

(72) Inventors: Brian L. Spohn, Holly, MI (US); Richard D. Starr, Milford, MI (US); Todd M. York, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 181 days.

(21) Appl. No.: 14/527,067

(22) Filed: Oct. 29, 2014

(65) Prior Publication Data

US 2016/0123494 A1   May 5, 2016

(51) Int. Cl.
*F16H 31/00* (2006.01)
*F16K 31/52* (2006.01)
*F16K 31/10* (2006.01)

(52) U.S. Cl.
CPC .......... *F16K 31/521* (2013.01); *F16K 31/105* (2013.01)

(58) Field of Classification Search
CPC .... F16K 31/521; F16K 31/105; F16K 31/523; F16K 31/52; F16K 31/0606
See application file for complete search history.

(56) References Cited

U.S. PATENT DOCUMENTS 2,682,004 A *  6/1954 Schulenburg ........ H01H 51/086
                                                    254/DIG. 12
2,683,841 A *  7/1954 Rogers ...................... H03J 1/22
                                                    310/23
3,069,164 A * 12/1962 Kohlberg ................. A63D 5/08
                                                    473/73
3,257,112 A *  6/1966 La Rue Webb .......... A63D 5/08
                                                    473/114
3,327,521 A *  6/1967 Briggs ...................... F04F 9/04
                                                    73/40.7
5,868,034 A *  2/1999 McFadden .............. F16H 59/04
                                                    74/128
6,433,452 B1 * 8/2002 Graham ................... H02K 7/07
                                                    310/103
8,380,400 B2 * 2/2013 Kanai ..................... B60L 8/003
                                                    134/123

(Continued)

*Primary Examiner* — William Kelleher
*Assistant Examiner* — Zakaria Elahmadi
(74) *Attorney, Agent, or Firm* — Quinn Law Group, PLLC

(57) ABSTRACT

A multi-position actuator includes a solenoid selectively energized to extend a rod. The actuator also includes a push-lever pivotably mounted to the rod and a crank-arm rotatably mounted on a first axis. The crank-arm includes multiple engagement elements arranged on a diameter centered relative to the first axis, and also includes a projection. The push-lever engages one of the engagement elements to rotate the crank-arm about the first axis in a forward direction when the solenoid is energized. The actuator additionally includes a pivoting locking-lever that blocks rotation of the crank-arm in forward direction and a one-way-clutch that blocks rotation of the crank-arm in reverse direction when the solenoid is de-energized. Furthermore, the actuator includes a slider-box lever having first and second slots. The projection slidably engages the first slot. The second slot is engaged with and operates an external device when rotation of the crank-arm swings the slider-box lever.

10 Claims, 3 Drawing Sheets

(56) References Cited

U.S. PATENT DOCUMENTS

| | | | |
|---|---|---|---|
| 8,683,888 B2 * | 4/2014 | Sickart | F16H 59/0204 74/473.18 |
| 2004/0016314 A1 * | 1/2004 | Satoh | F16H 59/10 74/473.3 |
| 2004/0118237 A1 * | 6/2004 | Kato | F16H 59/105 74/473.3 |
| 2011/0138955 A1 * | 6/2011 | Sickart | F16H 59/0204 74/473.3 |
| 2011/0162475 A1 * | 7/2011 | Rake | F16H 61/22 74/473.3 |

* cited by examiner

MULTI-POSITION ACTUATOR

TECHNICAL FIELD

The disclosure relates to a multi-position actuator.

BACKGROUND

In general, an actuator is a type of motor for moving or controlling a mechanism or system. It is operated by a source of energy, typically electric current, hydraulic fluid pressure, or pneumatic pressure, and, in turn, converts that energy into motion. An actuator is the mechanism by which a control system, such as a mechanical or electronic system, acts upon an environment. Specifically, an actuator can be employed for controlling operation of a piece of equipment, such as a valve or a lock.

SUMMARY

A multi-position actuator includes an actuator housing defining an enclosure, and a solenoid assembly arranged within the enclosure. The solenoid assembly includes a solenoid rod configured to selectively extend when the solenoid is energized. The multi-position actuator also includes a push-lever arranged within the enclosure and pivotably mounted to the solenoid rod. The push-lever is configured to extend with the solenoid rod when the solenoid is energized. The actuator additionally includes a crank-arm arranged within the enclosure and rotatably mounted on a first axis. The crank-arm includes a plurality of engagement elements arranged on a pitch circle diameter that is centered relative to the first axis. One of the plurality of engagement elements is engaged by the push-lever to thereby rotate the crank-arm about the first axis in a forward or first direction each instance the solenoid is energized. The crank-arm also includes a crank-arm projection.

The actuator also includes a locking-lever pivotably mounted to the push-lever and configured to block rotation of the crank-arm in the forward direction when the solenoid is de-energized. The actuator additionally includes a one-way-clutch (OWC) arranged within the enclosure and configured to block rotation of the crank-arm in a reverse or second direction that is opposite to the first direction when the solenoid is de-energized. Furthermore, the actuator includes a slider-box lever arranged within the enclosure and configured to swing back and forth through a predetermined angle about a second axis. The slider-box lever includes a first slot and a second slot. The crank-arm projection is slidably engaged with the first slot and the second slot is configured to slidably engage an actuating projection of an external device. The rotation of the crank-arm is configured to swing the slider-box lever for operating the external device.

The crank-arm may define a lock notch. Additionally, the locking-lever may include a surface configured to engage the lock notch, and thereby block rotation of the crank-arm in the forward direction when the solenoid is de-energized.

The multi-position actuator may also include a clock spring arranged between the push-lever and the locking-lever. The clock spring can be configured to bias the locking-lever to a predetermined position with respect to the push-lever such that the locking-lever engages the lock notch.

The multi-position actuator may additionally include a return spring having a first spring end fixed relative to the actuator housing, and a second spring end configured to engage the push-lever and pivot the push-lever relative to the solenoid rod. The return spring can thereby facilitate and maintain engagement of the push-lever with the one of the plurality of engagement elements being engaged by the push-lever when the solenoid is energized, and retract the solenoid rod into the solenoid assembly when the solenoid is de-energized.

The multi-position actuator may additionally include a tab fixedly mounted to the actuator housing and configured to contact the locking-lever to thereby limit extension of the solenoid rod when the solenoid is energized.

The actuator housing may include a first housing portion and a second housing portion configured to be assembled together and thereby define the enclosure. Each of the slider-box lever, the OWC, and the tab is mounted to the first housing portion and the first spring end of the return spring is mounted to the second housing portion.

The multi-position actuator may also include an electrical connector or terminal configured to accept an electrical connection to an external electrical source for energizing the solenoid.

The multi-position actuator may additionally include an over-pressure spring configured to operatively connect the actuating projection and the external lever. The over-pressure spring is configured to set a magnitude of a force at which the external device is actuated by the slider-box lever.

The multi-position actuator may additionally include a first proximity sensor positioned adjacent to, i.e., within an operative distance of, the solenoid rod and configured to detect a position of the solenoid rod.

The multi-position actuator may also include a second proximity sensor configured to detect a position of the external device relative to the actuating projection.

The electrical terminal may also include electrical connections for the first and second proximity sensors.

The external device may be a control valve configured to regulate fluid flow through a passage. Such a control valve may include a control valve lever that is operatively connected with the actuating projection, and the actuating projection is, in turn, engaged with the second slot.

The above features and advantages, and other features and advantages of the present disclosure, will be readily apparent from the following detailed description of the embodiment(s) and best mode(s) for carrying out the described disclosure when taken in connection with the accompanying drawings and appended claims.

2-3, with some components removed to expose features of a connection between the multi-position actuator and the external lever.

DETAILED DESCRIPTION

Figure 1:
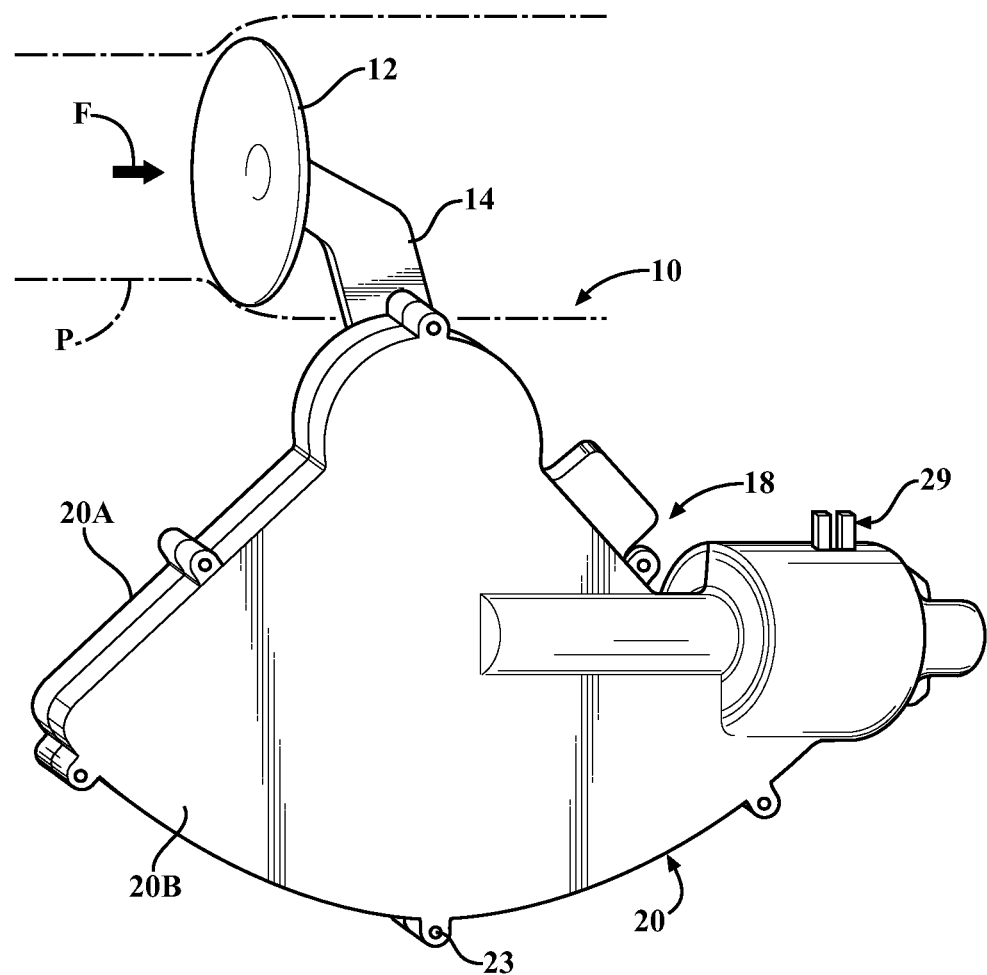
FIG. 1 is a schematic perspective view of a multi-position actuator having a first housing portion, a second housing portion, and an external lever coupled to a control valve.

Referring to the drawings, wherein like reference numbers refer to like components, FIG. 1 shows a control valve assembly 10. The control valve assembly 10 includes a control valve 12. The control valve 12 includes an external or control valve lever 14. The external lever 14 is operatively connected to an actuating projection 16 (shown in FIG. 2). The control valve 12 may be positioned in a passage P for regulating flow of a fluid characterized by a fluid pressure value. As additionally shown in FIG. 1, the control valve assembly 10 also includes a multi-position actuator 18 operatively connected to and configured to operate the control valve 12. Accordingly, the control valve 12 is positioned as an external device with respect to the multi-position actuator 18.

Figure 2:
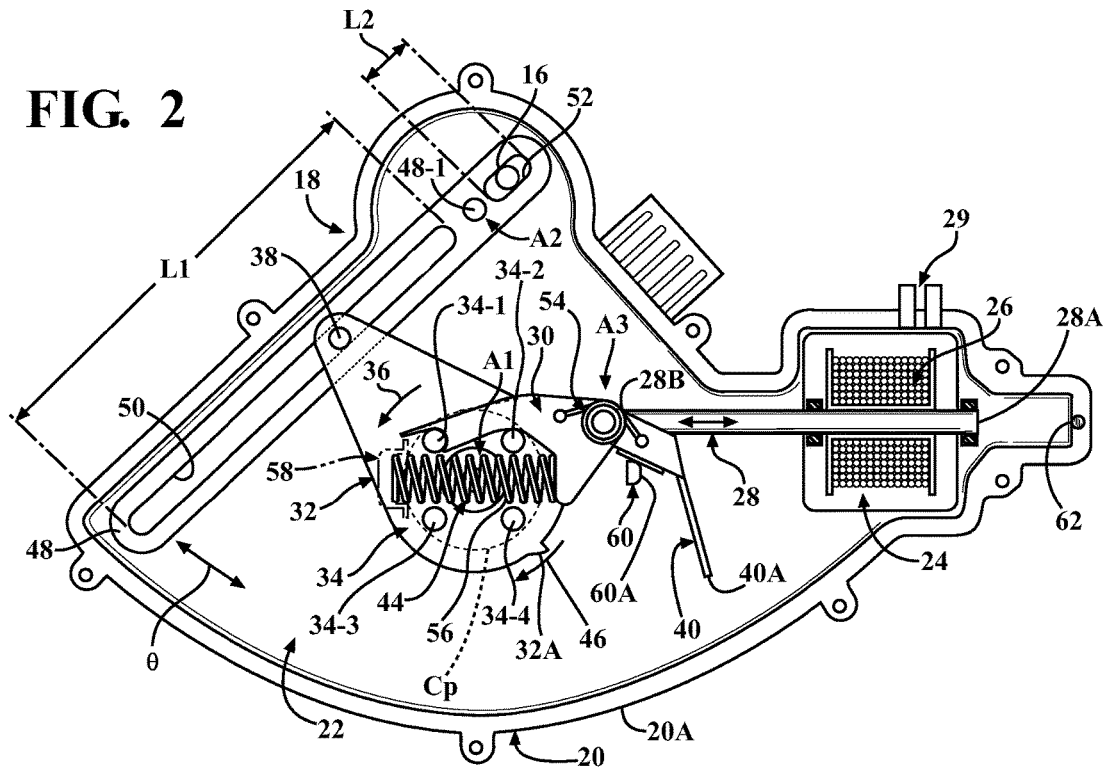
FIG. 2 is a schematic view of the multi-position actuator shown in FIG. 1 with the second housing portion removed to expose the interior of the housing, depicting an internal solenoid assembly in energized state.

The multi-position actuator 18 includes an actuator housing 20. As shown in FIG. 1, the actuator housing 20 may include a first housing portion 20A and a second housing portion 20B configured to be assembled and, as shown in FIG. 2, may thereby define an enclosure 22. The first housing portion 20A and second housing portion 20B may be fastened together via appropriate fasteners, such as screws 23, or via other known methods. Each of the first and second housing portions 20A, 20B may be constructed from a suitable impact and heat resistant material, such as aluminum and/or thermoplastic. The multi-position actuator 18 also includes a solenoid assembly 24 arranged within the enclosure 22. The solenoid assembly 24 may be mounted to one of the first and second housing portions 20A, 20B or be retained by the combined features of housing portions 20A and 20B when the actuator housing 20 is assembled.

The solenoid assembly 24 includes a solenoid 26 and a solenoid rod 28 that is configured to extend out of the solenoid when the solenoid 26 is electrically energized by an external power source (not shown), such as a battery regulated by a programmable controller. As shown, the solenoid rod 28 includes a first end 28A and a distal second end 28B. An electrical terminal 29 may be secured on the actuator housing 20 and be configured to accept an electrical connection to the external power source for energizing the solenoid 26. In the event that the control valve assembly 10 is employed in a motor vehicle (not shown), the contemplated controller may, for example, be configured to also regulate various vehicle systems and functions, such as the vehicle's powertrain or the vehicle's Heating Ventilation, and Air Conditioning (HVAC) system. If, for example, the control valve 12 regulates a flow of exhaust gas from such a vehicle's internal combustion engine through the passage P, the heat resistant first and second housing portions 20A, 20B would serve to protect the solenoid assembly 24, along with other components of the multi-position actuator 18 that will be described in detail below, from elevated temperatures of the exhaust gas.

Figure 3:
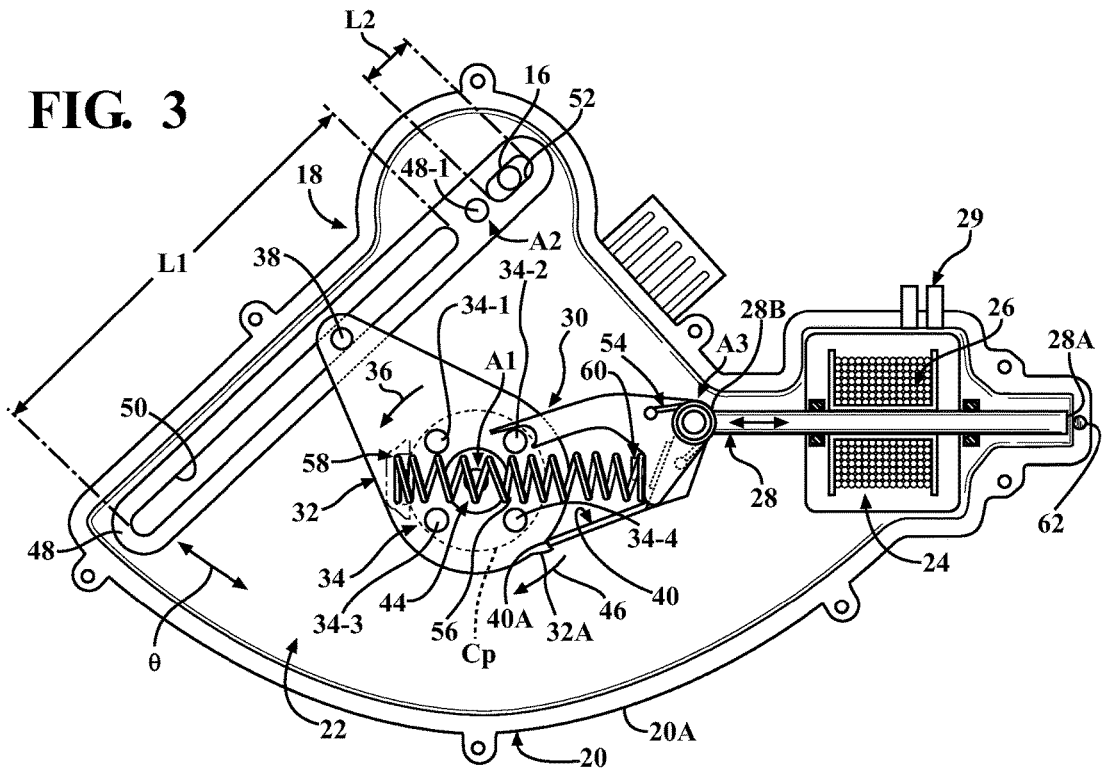
FIG. 3 is a schematic top view of the multi-position actuator shown in FIG. 1 with the second housing portion removed to expose an interior of the housing, depicting the internal solenoid assembly in de-energized state.

The multi-position actuator 18 also includes a push-lever 30 arranged within the enclosure 22. The push-lever 30 is pivotably mounted to the solenoid rod 28 at the second end 28B and configured to extend with the solenoid rod when the solenoid 26 is energized. Additionally, the multi-position actuator 18 includes a crank-arm 32 arranged within the enclosure 22 and rotatably mounted on a first axis A1. The crank-arm 32 includes a plurality of engagement elements, such as teeth or pegs, 34 arranged on the diameter D of a pitch circle Cp that is centered relative to the first axis A1. Although shown as four individual engagement elements 34-1, 34-2, 34-3, and 34-4, the plurality of engagement elements 34 may include any number of multiple engagement elements arranged concentrically around the first axis A1. One of the plurality of engagement elements 34, for example the engagement element 34-1, as shown in FIG. 2, is engaged by the push-lever 30 to thereby rotate the crank-arm 32 about the first axis A1 in a forward or first direction 36, shown as counter-clockwise (CCW) rotation in FIG. 2, each time or instance the solenoid 26 is energized. As shown in FIG. 3, after the solenoid 26 is de-energized, the solenoid rod 28 is retracted along with the push-lever 30 and thereby positions the push-lever for engagement with an adjacent engagement element 34-2. The next time the solenoid 26 becomes energized, the push-lever 30 engages the adjacent engagement element 34-2 for additional rotation of the crank-arm 32 about the first axis A1 in the first direction 36. The crank arm 32 also includes a crank-arm projection 38 that is moved with respect to the first axis A1 in the first direction 36 each time the solenoid 26 is energized.

The multi-position actuator 18 also includes a locking-lever 40 pivotably mounted to the push-lever 30 and configured to block rotation of the crank-arm 32 in the forward direction 36 when the solenoid 26 is de-energized. The multi-position actuator 18 additionally includes a one-way-clutch (OWC) 44 arranged within the enclosure 22. As shown, the OWC 44 may be fixed to the first housing portion 20A. The OWC 44 may be configured as a dog-clutch, or any other appropriate mechanism permitting rotation in a particular selected direction, but not in the opposite direction, as understood by those skilled in the art. Accordingly, the OWC 44 is configured to block rotation of the crank-arm 32 in a reverse or second direction 46 (that is opposite to the first direction 36), shown as clockwise (CW) rotation in FIG. 2, when the solenoid 26 is de-energized.

A slider-box lever 48 is arranged within the enclosure 22 and configured to swing back and forth about a second axis A2 through a predetermined angle θ defined by the housing 20. As shown in FIGS. 2-3, a pin 48-1 may be used to locate the slider-box 48 on the second axis A2 relative to the first housing portion 20A and/or the second housing section 20B. As such, the slider-box lever 48 may be rotatably fixed to the first housing portion 20A and/or the second housing section 20B, and the angle θ may be defined by the first and/or the second housing portions, as well. The slider-box lever 48 includes a first slot 50 and a second slot 52, wherein the crank-arm projection 38 is slidably engaged with the first slot 50 and the second slot 52 is slidably engaged with the actuating projection 16 of the external lever 14. The rotation of the crank-arm 32 is configured to swing the slider-box lever 48 and actuate the control valve 12. As shown in FIGS. 2-3, the first slot 50 is defined by a length L1, while the second slot 52 is defined by a length L2. The length L1 may be greater than the length L2, thus permitting the crank-arm 32 to achieve a full 360° rotation about the first axis A1 during actuation of the slider-box lever 48 through its range of motion defined by the angle θ. Additionally, the length L1 being greater than the length L2 may permit an advantageous lever ratio to be employed in the slider-box lever 48 for actuating the external lever 14 and the control valve 12.

As shown, the crank-arm 32 defines a lock notch 32A. The locking-lever 40 includes a surface 40A configured to engage the lock notch 32A when the solenoid 26 is de-energized. The surface 40A is brought in contact and engages the lock notch 32A when the push-lever 30 is retracted along with the solenoid rod 28, thus rotating the locking lever 40 about a third axis A3. When the surface 40A engages the lock notch 32A, rotation of the crank-arm 32 becomes blocked in the forward direction 36 in order to prevent over-travel thereof. In other words, the engagement of the surface 40A with the lock notch 32A limits rotation of the crank-arm 32 to a predetermined angle, such that the next engagement element, for example the engagement element 34-2, as shown in FIG. 3, becomes positioned for reliable engagement by the push-lever 30 the subsequent instance the solenoid 26 is energized. Thus, repeating rotation of the crank-arm 32 about the first axis A1 is assured with every instance the solenoid 26 is energized.

Figure 4:
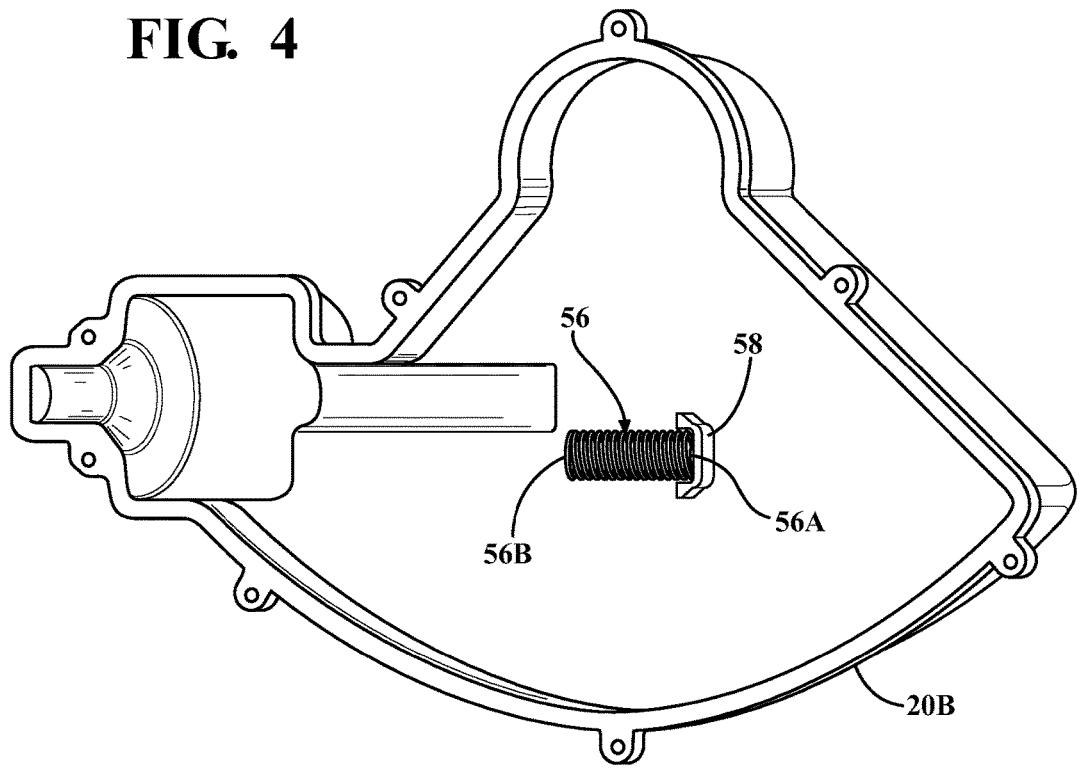
FIG. 4 is a schematic bottom view of the multi-position actuator shown in FIG. 1 with the first housing portion removed to expose the interior of the housing.

The multi-position actuator 18 may additionally include a clock spring 54. As shown, the clock spring 54 is arranged between the push-lever 30 and the locking-lever 40. The clock spring 54 is configured to bias the locking-lever 40 to a predetermined position with respect to the push-lever 30, such that the locking-lever engages the lock notch 32A to block rotation of the crank-arm 32 in the forward direction 36. The multi-position actuator 18 may also include a return spring 56. The return spring 56 includes a first spring end 56A fixed relative to the actuator housing 20, such as via a spring-stop feature 58 mounted on the actuator housing, and a second spring end 56B. The second spring end 56B is configured to engage the push-lever 30 and pivot the push-lever relative to the solenoid rod 28 to thereby facilitate and maintain engagement of the push-lever 30 with the particular engagement element 34-1, 34-2, 34-3, 34-4 that is being engaged at the time by the push-lever 30 when the solenoid 26 is energized and retract the solenoid rod 28 into the solenoid assembly 24 when the solenoid is de-energized. As shown in FIG. 4, the spring-stop feature 58 may be mounted on the second housing portion 20B, such that the first spring end 56A of the return spring 56 becomes fixed to the second housing portion.

Figure 5:
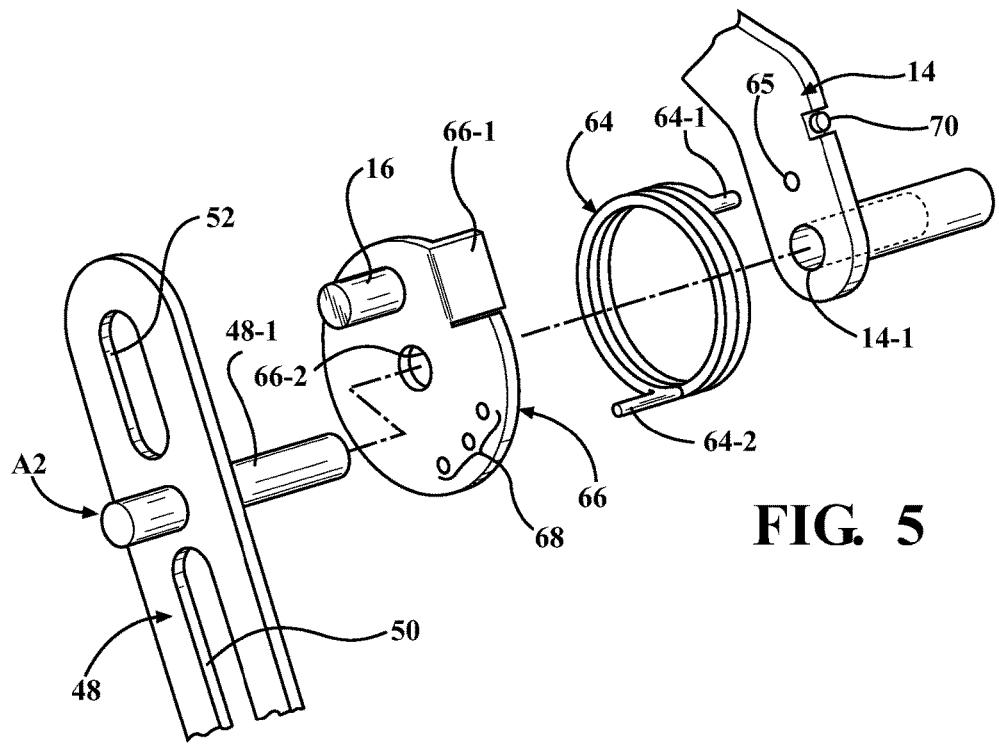
FIG. 5 is a schematic close-up exploded perspective view of a portion of the multi-position actuator shown in FIGS.

The multi-position actuator 18 may also include a tab 60 fixedly mounted to the actuator housing 20. The tab 60 includes a rounded surface 60A that is configured to slidably contact the locking-lever 40 in order to decouple the locking-lever from the projection 38 of the crank arm 32 when the solenoid 26 is energized. As shown in FIGS. 2-3, the tab 60 may be fixed to the first housing portion 20A. A first proximity sensor 62 may be positioned on the actuator housing 20, adjacent to, i.e., within operative distance of, the first end 28A of the solenoid rod 28. The first proximity sensor 62 is configured to detect a position of the solenoid rod 28. As shown in FIG. 5, the multi-position actuator 18 may also include an over-pressure spring 64 configured to operatively connect the actuating projection 16 and the external lever 14. As shown, the over-pressure spring 64 is positioned between the actuating projection 16 and the external lever 14 and may be configured as a clock spring. The over-pressure spring 64 provides operative connection between the actuating projection 16 and the external lever 14. The over-pressure spring 64 establishes or sets a specific magnitude of a force F (shown in FIG. 1), as well as a corresponding fluid pressure value in the passage P, at which the external lever 14 is actually moved or actuated by the slider-box lever 48. The over-pressure spring 64 includes a first end 64-1 and a second end 64-2. As may be seen in FIG. 5, the first end 64-1 may be fixed to the external lever 14 at an aperture 65 defined thereby.

With continued reference to FIG. 5, the actuating projection 16 may be an integral component of a rotating plate 66 that defines one or more individual apertures 68. Each of the apertures 68 is configured to selectively accept the second end 64-2 of the over-pressure spring 64. The specific location of each aperture 68, when engaged with the second end 64-2, sets a specific pressure value at which the external lever will be moved by the slider-box lever 48. The external lever 14 may be piloted with respect to the slider-box lever 48 via a combination of the pin 48-1 and an aperture 14-1. Furthermore, the rotating plate 66 may define an aperture 66-2 that permits the pin 48-1 to pass therethrough and thereby also pilots the rotating plate relative to the slider-box lever 48 and the external lever 14. The above construction would permit all three components, the slider-box lever 48, the rotating plate 66, and the external lever 14 to rotate about the second axis A2.

As additionally shown in FIG. 5, the rotating plate 66 may include a reference surface 66-1. A second proximity sensor 70 is positioned in a fixed relationship with the control valve 12 and configured to detect a position of the control valve 12 relative to the actuating projection 16. Specifically, the second proximity sensor 70 may be arranged on the external lever 14 in order to detect a relative distance between the reference surface 66-1 and the external lever, and thereby determine a position of the actuating projection 16. Each of the first and second proximity sensors 62, 70 is in electrical connection with the terminal 29 for communicating the respective detected positions of the solenoid rod 28 and the actuating projection 16 to thereby facilitate feed-back control of the multi-position actuator 18 via the above-mentioned controller. The reference surface 66-1 may also operate as a positive stop for the external lever 14 in the event a force of the spring 64 is exceeded when the control valve 12 bottoms out in the valve-closed position at the passage P, as shown in FIG. 1.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A multi-position actuator comprising:
   an actuator housing defining an enclosure;
   a solenoid assembly arranged within the enclosure and having a solenoid and a solenoid rod configured to selectively extend when the solenoid is energized;
   a push-lever arranged within the enclosure and pivotably mounted to the solenoid rod and configured to extend with the solenoid rod when the solenoid is energized;
   a crank-arm arranged within the enclosure and rotatably mounted on a first axis, the crank-arm having a plurality of engagement elements arranged on a pitch circle diameter that is centered relative to the first axis, wherein one of the plurality of engagement elements is engaged by the push-lever to thereby rotate the crank-arm about the first axis in a first direction each time the solenoid is energized, and having a crank-arm projection;

a locking-lever pivotably mounted to the push-lever and configured to block rotation of the crank-arm in the first direction when the solenoid is de-energized;

a one-way-clutch (OWC) arranged within the enclosure and configured to block rotation of the crank-arm in a second direction that is opposite to the first direction when the solenoid is de-energized; and a slider-box lever arranged within the enclosure and configured to swing back and forth through a predetermined angle about a second axis, and having a first slot and a second slot, wherein the crank-arm projection is slidably engaged with the first slot, and the second slot is configured to slidably engage an actuating projection of an external device, and wherein the rotation of the crank-arm is configured to swing the slider-box lever for operating the external device.

2. The multi-position actuator of claim 1, wherein:
the crank-arm defines a lock notch; and
the locking-lever includes a surface configured to engage the lock notch and thereby block rotation of the crank-arm in the first direction when the solenoid is de-energized.

3. The multi-position actuator of claim 2, further comprising a clock spring arranged between the push-lever and the locking-lever and configured to bias the locking-lever to a predetermined position with respect to the push-lever such that the locking-lever engages the lock notch.

4. The multi-position actuator of claim 1, further comprising a return spring having a first spring end fixed relative to the actuator housing and a second spring end configured to engage the push-lever and pivot the push-lever relative to the solenoid rod to thereby facilitate and maintain engagement of the push-lever with the one of the plurality of engagement elements being engaged by the push-lever when the solenoid is energized, and to retract the solenoid rod into the solenoid assembly when the solenoid is de-energized.

5. The multi-position actuator of claim 1, further comprising a tab fixedly mounted to the actuator housing and configured to contact the locking-lever to thereby limit extension of the solenoid rod when the solenoid is energized.

6. The multi-position actuator of claim 5, wherein the actuator housing includes a first housing portion and a second housing portion configured to be assembled together and thereby define the enclosure, and wherein each of the slider-box lever, the OWC, and the tab is mounted to the first housing portion and the first spring end of the return spring is mounted to the second housing portion.

7. The multi-position actuator of claim 1, further comprising an electrical terminal configured to accept an electrical connection to an external electrical source.

8. The multi-position actuator of claim 1, further comprising an over-pressure spring configured to operatively connect the actuating projection and the external lever and thereby set a magnitude of a force at which the external device is actuated by the slider-box lever.

9. The multi-position actuator of claim 1, further comprising a first proximity sensor positioned adjacent to the solenoid rod and configured to detect a position of the solenoid rod.

10. The multi-position actuator of claim 9, further comprising a second proximity sensor configured to detect a position of the external device relative to the actuating projection.

* * * * *